United States Patent [19]

Clark

[11] Patent Number: 5,247,450
[45] Date of Patent: Sep. 21, 1993

[54] ELECTRONIC TIMING SYSTEM FOR GLASSWARE-FORMING MACHINES

[75] Inventor: Anthony R. Clark, Farmland, Ind.

[73] Assignee: VHC Ltd., W. Palm Beach, Fla.

[21] Appl. No.: 654,246

[22] Filed: Feb. 12, 1991

[51] Int. Cl.$^5$ ............................................. G06F 15/46
[52] U.S. Cl. ............................... 364/473; 364/474.11; 364/138
[58] Field of Search .................. 364/473, 474.11, 131, 364/132, 138, 229–229.5, 230.4, 238; 395/200, 550, 275, 325

[56] References Cited

U.S. PATENT DOCUMENTS

| | | | |
|---|---|---|---|
| 3,755,789 | 8/1973 | Collins | 395/550 |
| 4,369,052 | 1/1983 | Hotmer | 65/160 |
| 4,463,416 | 7/1984 | Wood | 364/143 |
| 4,488,232 | 12/1984 | Swaney et al. | 395/200 |
| 4,628,480 | 12/1986 | Floyd | 395/275 |
| 4,641,269 | 2/1987 | Japenga et al. | 364/473 |
| 4,837,704 | 6/1989 | Lengefeld | 364/132 |

OTHER PUBLICATIONS

Product Description for IS Apilog Electronic Timer for IS Machine date unknown.
*Machine Design,* Sep. 20, 1990, "Serial Multiplexers, The next generation programmable controllers".

*Primary Examiner*—Jerry Smith
*Assistant Examiner*—Jim Trammell
*Attorney, Agent, or Firm*—Woodard, Emhardt, Naughton, Moriarty & McNett

[57] ABSTRACT

An electronic timing control system for a glassware-forming machine includes a mini-computer master controller which controls the timing and sequence of operation of each of the individual section glassware-forming machine components. The master controller includes a plurality of control modules for section timing, conveyor motion, etc., each module of which outputs information to a corresponding serial multiplex I/O module. Each of the I/O modules connected to the master controller feeds data to a common data cable, according to a multiplexing scheme administered by the master controller. Data from the data cable is fed to each of the sections of the I.S. glassware forming machine, and particularly to a plurality of serially connected serial multiplexer modules. Each of the serial multiplexer modules corresponds to a section functional component operable to receive and form molten glass gobs into glassware articles. Each serial multiplexer module has a unique address. Information conveyed by the data cable includes a specific address for the module to which the data being transmitted is to be provided. Thus, although control data from the master controller is provided serially to all of the multiplexer I/O modules, only that module corresponding to an address transmitted by the controller is permitted to receive the data.

4 Claims, 4 Drawing Sheets

ELECTRONIC TIMING SYSTEM FOR GLASSWARE-FORMING MACHINES

BACKGROUND OF THE INVENTION

The invention relates generally to electronic timing systems and controllers for controlling the cyclical operation of a number of individual section (I.S.) glassware-forming machines. More specifically, the invention relates to communication between a master I.S. machine controller and individual controllers associated with each component of the I.S. machine.

Electronic timing or control systems have been applied in the glassware-forming art to provide programmable means for operating complex individual section or I.S. glassware-forming machines. The glassware forming machine is typically comprised of a plurality of individual sections which are integrated into a single plural section machine fed by a single source of molten glass. The sections include functional components which are operated in synchronism in response to control signals received from an electronic timing or control system. For instance, the functional components of each section may include an electronic valve block, an electronic gob distributor and an electronic glassware transfer mechanism for conveying the newly formed glass from the section deadplate to a moving conveyor. Electronic timing is typically provided by programmable machine controllers which utilize a central processing unit and several satellite computer units associated with each I.S. machine section. The master control computer for the complete glassware-forming machine, as well as the individual control computers for each of the section components, must be capable of processing a variety of input and output data for controlling the function of each of these components, as well as data indicating the status of the operation of the components.

Several electronic I.S. machine control systems are known in the art. For instance, the patent to Hotmer, U.S. Pat. No. 4,369,052, discloses a forming supervisory control computer for controlling the operation of individual section glassware-forming machines. This reference describes a forming supervisory computer, a machine supervisory computer and individual section computers that are connected by serial input/output interface boards. The patent to Japenga et al., U.S. Pat. No. 4,641,269, shows a similar supervisory system in which a machine supervisory computer communicates with a number of local section computers through a multiplexer which conveys information to an appropriate section computer.

Another I.S. machine controller is produced by ESIA of France, known as the IS-Apilog, which includes a main controller and several machine interface controllers, as described in ESIA product description NTC/1220B/005/0/RP. Electronic information is communicated between the various components of the Apilog machine by way of several multi-conductor cables. The Apilog unit, as with the other units just discussed, requires the use of multi-conductor cables for electronic communication between the components of the unit. For instance, the Apilog device is disclosed as requiring the use of a 17 conductor cable connecting between each section control unit and a section relay box, and 35 conductor connecting cables between each section relay box and the main control cabinet.

The electronic timing and control systems for the I.S. glassware forming machines of the prior art have produced beneficial results in that a variety of control and information functions are now integrated into a single master or supervisory machine. However, these prior art I.S. machine controllers require the use of a multitude of electrical conductors and cables to transmit data to and from the master controller and the individual section component controllers. In many instances, these cables must run over long distances, often up to 200 feet among the farthest-most sections of an I.S. machine. Most I.S. machine control systems include a tangled array of electrical connectors and wires which present a variety of problems to the assembly and maintenance of an I.S. machine system. Moreover, a greater number of conductors or wires increases the cabling cost for a specific I.S. machine installation.

There is, therefore, a need for an I.S. electronic timing and control system which can significantly reduce the cabling requirements as well as the hardware costs associated with cables and connectors. There is also a need for an electronic timing system which is less expensive, more reliable and easier to trouble-shoot.

DESCRIPTION OF THE PREFERRED EMBODIMENT

Figure 1:
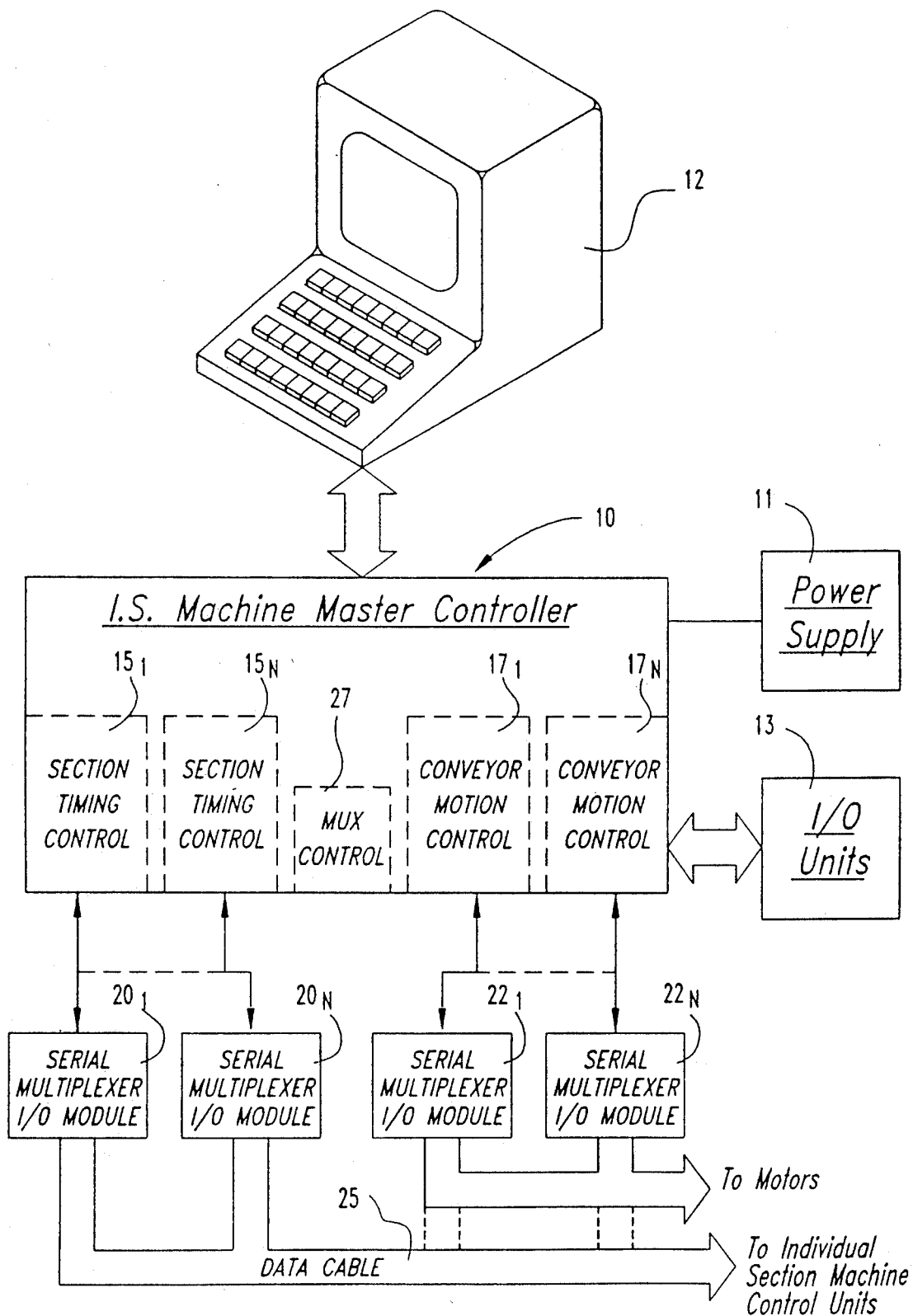
FIG. 1 is a schematic block diagram of one embodiment of the invention for control of a multi-section glassware forming machine, particularly showing the components of the machine master controller portion.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The electronic timing system of the present invention is adapted for use in controlling the timed operation of various functional components of an I.S. machine. For instance, it is known that a conventional I.S. machine includes a number of individual sections, and that each of these sections includes certain functional components that receive molten gobs of glass, form glassware articles from the gobs and transfer the finished glassware article to a conveyor. An electronic valve block can control the phased operation of these functional components in response to signals from an I.S. machine timing and control system.

In FIG. 1, the principal components of the I.S. machine electronic timing and control system of the present invention are shown, which includes an I.S. machine master controller 10. The master controller 10 comprises a mini-computer which is powered by power supply 11. A control and display console 12 permits user interface with the master controller, as well as the input/output units 13. The master controller 10 of the preferred embodiment can be any of the known electronic timing systems, such as the Apilog system previously described. The master controller 10 controls the phased or timed operation of a number of individual sections, usually 6 or 12, and the functional components of these sections.

The master controller 10 includes a number of section timing control modules $15_1$-$15_n$, one each of the timing control modules corresponding to each of the individual sections of the glassware-forming machine being controlled by the present system. The timing control modules $15_n$ provide section timing signals that determine the phase or sequence of operation of each section and its functional components. The timing and control modules $15_n$ feed timing data to the electronic valve block of a section. Likewise, a number of article transfer motion control modules $17_1$-$17_n$ are also included within the I.S. machine master controller 10. Each article transfer motion control module provides signals for controlling the motion of an electronic pusher of each section, such as that described in the U.S. Pat. No. 4,923,499 to Newkirk. Each of these control modules $15_n$ and $17_n$ can constitute integrated circuit boards that interface with the minicomputer components of the master controller 10.

In the present invention, each of the timing control modules $15_1$-$15_n$ is connected to a respective serial multiplex I/O module $20_1$-$20_n$. Optionally, each of the article transfer motion control modules $17_1$-$17_n$ is connected to a like number of serial multiplex I/O modules $22_1$-$22_n$. Each of these serial multiplex I/O modules $20_n$ (and optionally $22_n$) is connected to a data cable 25 through which control data generated by the control modules $15_n$ (and optionally $17_n$) can be conveyed to individual section control units that control the operation of the functional components of an individual section of the glassware forming machine. In the preferred embodiment, the control modules $17_1$-$17_n$ are directly connected, through their respective I/O module $22_1$-$22_n$, to a corresponding pusher motor without passing through the data cable 25.

In particular, each of the serial multiplex I/O modules 20 and 22 can be the serial multiplexers manufactured by APC Corporation under the name SERIPLEX TM. The details of the construction and operation of the SERIPLEX TM modules are described in an article in the Sep. 20, 1990 issue of *Machine Design* magazine entitled "SERIAL MULTIPLEXERS THE NEXT GENERATION PROGRAMMABLE CONTROLLERS," which description and explanation is specifically incorporated herein by reference. Although provided by the incorporated reference, the specific construction of the SERIPLEX TM module is not part of the present invention. However, the function and capabilities of this module as described herein, in combination with the features of the I.S. master controller, are key aspects of the invention. The I.S. machine master controller 10 includes a multiplexer control 27 which multiplexes the data output by the number of serial multiplexer I/O modules $20_n$ and $22_n$ so that a serial bit stream is transmitted by way of the data cable 25 with data from each module interleaved.

Figure 2:
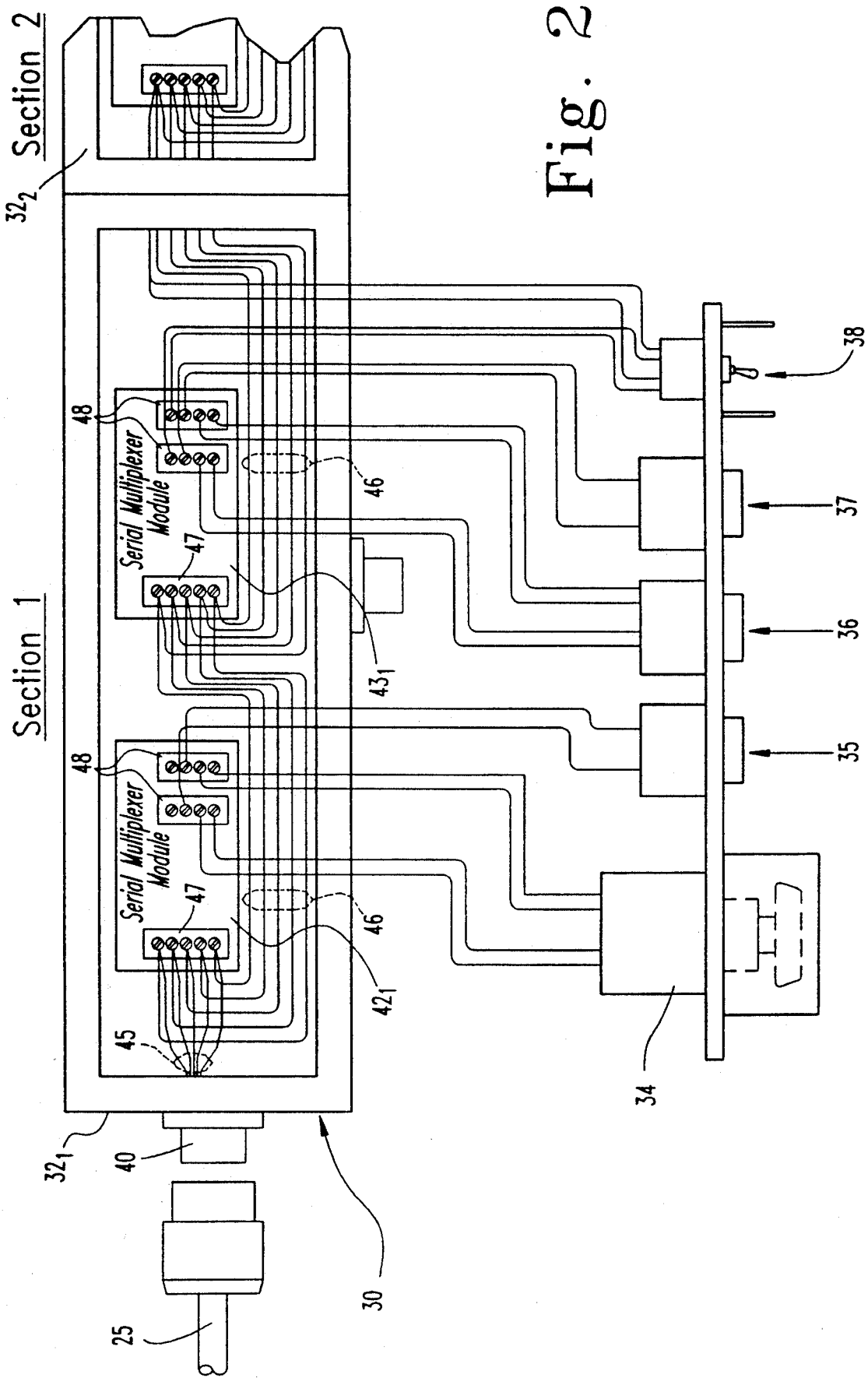
FIG. 2 is a diagrammatic view of a valve block cover of a blow-side control panel of an I.S. machine connected to the machine master controller shown in FIG. 1.

The data cable 25 connects to the I.S. glassware-forming machine at the blow side of a press and blow I S. control panel 30 (or the final blow side of a blow and blow type I.S. machine), as shown in FIG. 2. The blow side control panel is a known component of the I.S. glassware-forming machines. The control panel 30 includes a number of section control units $32_1$-$32_n$ (although only control units $31_1$ and $31_2$ for two sections are shown in FIG. 2). The control panel 30 also carries a number of input/output devices, such as emergency stop switch 34, run pilot light 35, programmed stop switch 36, gob enable switch 37 and hot bottle rejection switches 38 (which will be 2 for a double gob and 3 for a triple gob machine). Each of these I/O devices provides means for the machine operator to interface with the section operation. Each of the section control units $32_n$ controls and monitors the on/off and emergency status of a respective section, and conveys information to and from the master controller 10 regarding section status or operator intervention. The blow side I.S. control panel 30 includes a cable connector 40 which mates with the data communication cable 25. The cable connector 40 provides data communication to each section control module $32_n$, and more particularly to serial multiplex modules $42_n$ and $43_n$ in each section. For simplicity, only serial multiplex modules $42_1$ and $43_1$ for a first section are depicted in FIG. 2. Five control data lines 45 are provided from the cable connector 40 to an input terminal bar 47 on the first serial multiplex module $42_1$. The second serial multiplex module $43_1$ is connected in series with the first module $42_1$ by way of serial interconnect lines 46. Thus, data flowing through the data communication cable 25 passes serially between each of the serial multiplexer modules $42_1$ and $43_1$. A second group of module serial interconnect lines 46 is provided from the input terminal bar 47 of serial multiplex module 43 to the multiplex modules of the next section control unit $32_2$. Each of the serial multiplex modules $42_n$ and $43_n$ also includes a pair of device I/O terminal bars 48. Each of the input/output devices 34-38 associated with the blow side I.S. control panel 30 is connected to the modules 42 and 43 by way of the I/O terminal bars 48. Operator intervention, such by actuation of emergency stop switch 34, is conveyed through serial multiplex module $42_1$ and communication cable 25 to the master controller 10, which determines an appropriate response.

Figure 3:
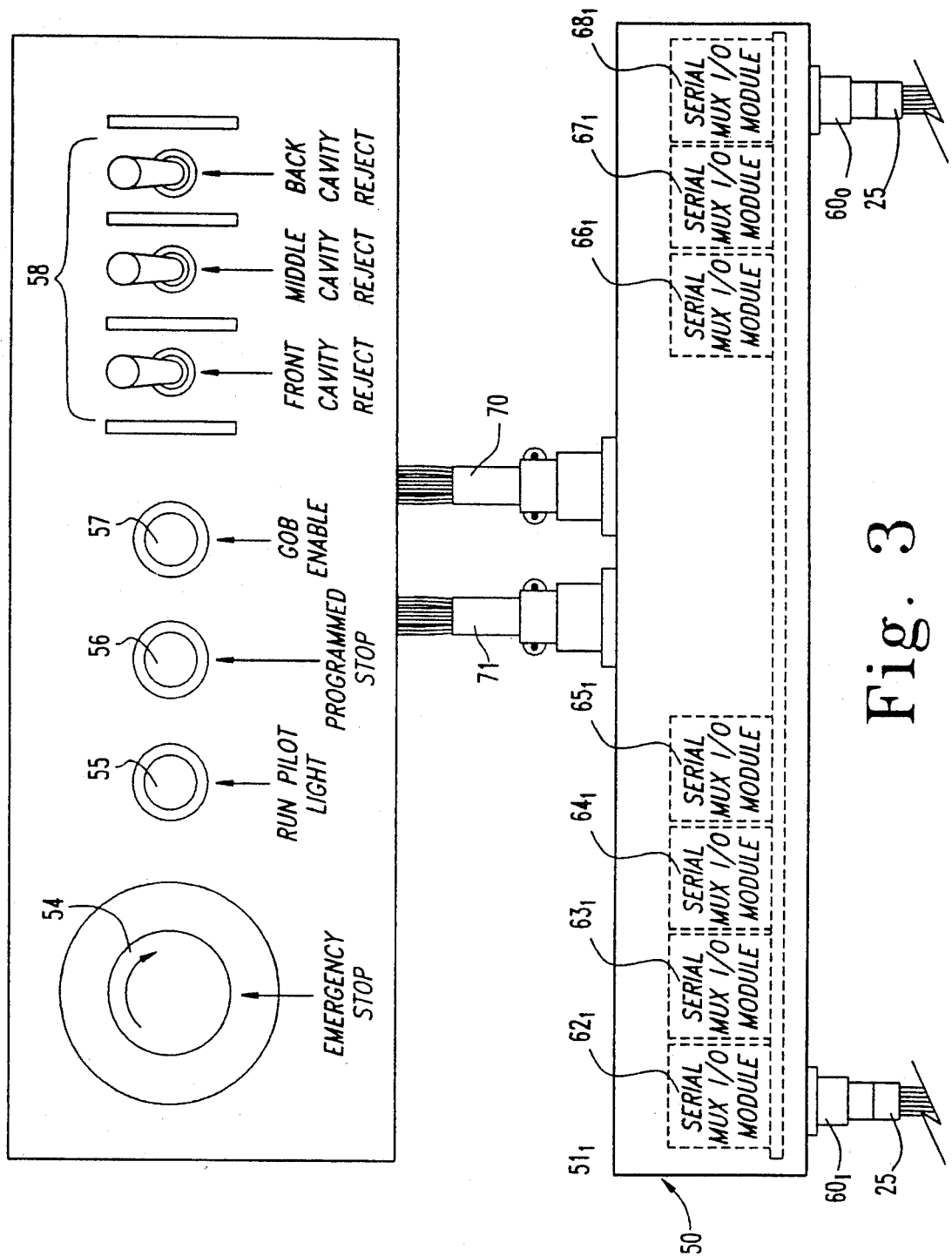
FIG. 3 is a diagrammatic view of a valve block cover for the I.S. machine being controlled by the machine master controller shown in FIG. 1.

Referring to FIG. 3, the valve block control panel 50 of the I.S. machine is shown which also includes a number of individual section control units $51_n$ which are similar to the control units $32_n$ described above, although only one section unit $51_1$ is shown. The valve block control panel 50 also includes a number of input/output devices, including the emergency stop switch 54, run pilot light 55, programmed stop switch 56, gob enable switch 57 and an array of cavity reject switches 58. The valve block control panel 50 provides an interface to an electronic valve body and includes an input connector $60_I$ and output connector $60_O$. The connectors $60_I$ and $60_O$ connect to the data communication cable 25 to transmit data to and from the I.S. machine master controller 10, and to and from adjacent I.S. control units $51_n$.

In the illustrated embodiment, the valve block control panel 50 includes a number of serial multiplex modules 62-68 associated with each of the individual section control units $51_n$. Each of these modules is associated with a particular function of the valve block control panel 50 and section control unit $51_n$. A valve block cover wire bundle 70 is connected to the number of modules 62-68 to transmit data to and from the I/O devices 54-58 of the valve block control panel. Data to and from these devices 54-58 and the master controller 10 permits operator interface at the valve block control panel of the I.S. machine.

Figure 4:
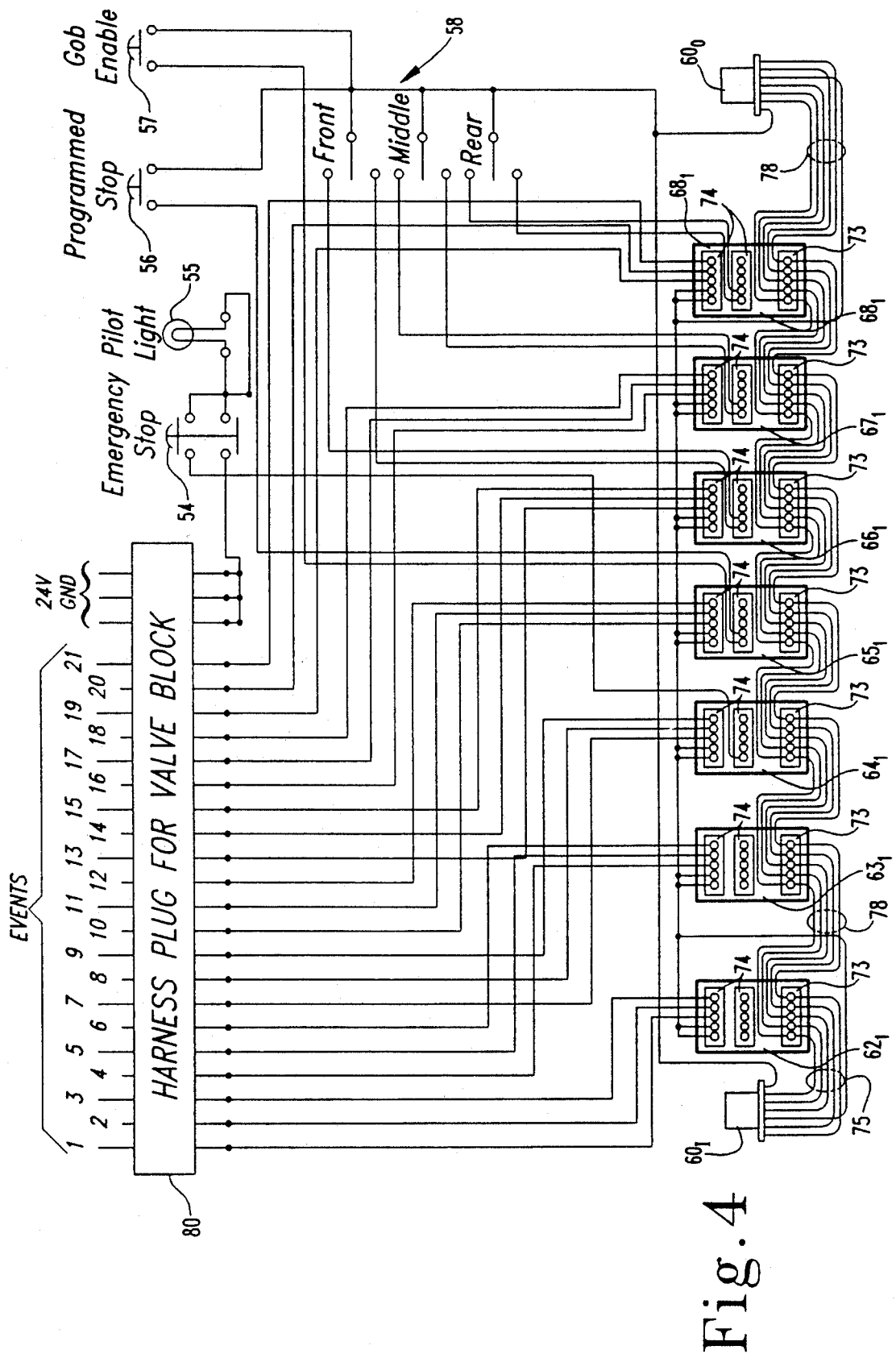
FIG. 4 is a detailed electrical schematic of the valve block control panel shown in FIG. 3.

The details of the valve block control panel 50 circuitry are shown in FIG. 4. Each of the serial multiplex modules 62-68 includes an input terminal bar 73 and a pair of device I/O terminal bars 74. The input terminal bars 73 of each of the serial multiplex modules are connected in series to the control data lines 75 which mate by way of the input and output connectors $60_I$ and $60_O$ to the data cable 25. Module serial interconnect lines 78 are connected between each of the input terminal bar 73 of consecutive serial multiplex modules 62-68. The last of the serial multiplex modules 68 is connected to the output connector $60_O$.

The input connector $60_I$ is a seven-wire connector, with five of the wires corresponding to the control data lines 75. One of the lines corresponds to a 24 volt powerline for the control valves of the valve block. A second line 77 provides DC ground to the valve block control panel electronics.

The wires emanating from the device I/O terminal bar 74 of each of the serial multiplex modules 62-68 are connected to the input/output components 54-58 as shown, or to an electronic valve block harness plug 80. In the illustrated embodiment, the valve block harness plug 80 includes 21 pin connections for controlling a number of I.S. functional events or for sensing I.S. operating conditions. The sequence of events of a particular I.S. functional component is controlled by the electronic valve block based upon the signals received through pin connections 1-21 of the harness plug 80. For instance, the gob distributor or the electronic pusher may be controlled by signals received through harness plug 80.

In the operation of the electronic I.S. machine timing system of the present invention, the I.S. machine master controller 10 determines the timing and sequence of the variety of glassware-forming operations to be performed by the I.S. machine, and more particularly by each of the individual sections that comprise the machine. As the timing and operation sequence is determined by the master controller 10, each of the section timing control modules $15_n$ and the article transfer motion control module $17_n$ generate control signals that are fed through their corresponding serial multiplex modules $20_n$ and $22_n$ to the data cable 25. The data cable 25 in one specific embodiment includes seven wires, one corresponding to the electrical power, another corresponding to the electrical ground, and the remaining five provided for transmitting specific operation data to an appropriate I.S. machine component.

As part of the I.S. machine master controller 10 operation, a specific address word is transmitted through the data cable 25, and particularly through the five data lines, to each of the serial multiplex modules $42_n$, $43_n$ and $62_n$-$68_n$. As explained more fully in the Machine Design article incorporated by reference above, each of these serial multiplex modules includes custom integrated circuitry to decode a data word relevant to that module only, which data word corresponds to an address of that particular module. Thus, the data can be transmitted serially along data cable 25 to each of the serial multiplex modules of the device, but only one device bearing the appropriate module address will actually be permitted to receive the data transmitted on the control data lines 75. When the address of a particular module is sensed on the data lines, that module, such as module $62_1$ in FIG. 3, receives the data from data line 75 and conveys that information to the appropriate pin locations of harness plug 80, which in this case are pin locations 1-3. These particular pin locations correspond to certain phases in the operational sequence of the particular valve block component which is connected to the harness plug 80. For instance, the information conveyed through pins 1-3 of the harness plug 80 may include instructions to an electronic pusher to begin its arm sweep to transfer a newly formed bottle from the dead plate to the transfer conveyor.

It is understood that while each of the serial multiplex modules described may be the SERIPLEX TM device, other serial multiplex modules may be utilized. The important aspect, however, is that the modules are configured for serial connection and include some means for addressing only those serial multiplexer I/O modules that need be addressed to receive or transmit data between the master controller and each of the I.S. control units 32 and 51. With the present invention, the I.S. machine timing control systems of the prior art can be greatly streamlined so that only a single seven-wire cable need be connected between the master controller 10 and the individual sections of the I.S. glasswareforming machine. In some installations where the cables must run over 100-200 feet, this represents a substantial savings of wiring and hardware costs, as well as substantially less complexity of wiring between components of a glassware-forming system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An I.S. machine timing and control system for an individual section (I.S.) glassware forming machine having a plurality of sections operable in timed relationship within a cycle of operation of the machine, each of the sections having a plurality of functional components for forming articles of glassware in response to control signals which control the operation of the functional components, the I.S. machine timing and control system comprising:

a master controller for controlling the timed operation of the plurality of functional components, said master controller including a plurality of component control modules each having means for generating control signal data words relating to the timed operation of a corresponding one of the functional components;

a plurality of control end serial multiplexer I/O modules one each coupled to a corresponding one of said plurality of component control modules and each including means for encoding said data words received from said corresponding component control module with a unique identifier relating to said corresponding one of the functional components;

a plurality of section end serial multiplexer I/O modules having means for coupling to a corresponding one of said plurality of functional components, each of said plurality of section end modules having a unique address, and further having means for transmitting said data words to its corresponding functional component upon receipt of a unique identifier from one of said plurality of control end I/O modules when the received identifier corresponds to said unique address;

a data cable connecting said plurality of control end I/O modules to said plurality of section end I/O modules, said data cable having a number of data lines for simultaneously serially relaying said encoded data words and said unique identifier from each of said plurality of control end I/O modules to all of said section end I/O modules; and multiplexing means in said master controller for interleaving said data words and said unique identifier from each of said plurality of control end I/O modules for transmission along said data cable.

2. The I.S. machine timing and control system of claim 1, wherein each of said control end I/O modules is connected in parallel with each other.

3. The I.S. machine timing and control system of claim 1, wherein each of said plurality of section end I/O modules is connected in series with each other.

4. The I.S. machine timing and control system of claim 1, wherein:

each of said plurality of control end I/O modules includes means for defining a unique control and address for said control end I/O modules; and each of said plurality of section end I/O modules includes means for receiving information signals from said functional components and means for encoding said information signals with a unique control and identifier relating to a corresponding one of said control end I/O modules, whereby each of said control end I/O modules is responsive to receipt of one of said unique identifiers corresponding to one of said unique addresses of said control end I/O modules upon transmission of information signals from said section end I/O modules.

* * * * *